United States Patent

Nomura (10) Patent No.: US 10,283,777 B2
(45) Date of Patent: May 7, 2019

(54) SECONDARY BATTERY (71) Applicant: Masayoshi Nomura, Shizuoka (JP)

(72) Inventor: Masayoshi Nomura, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 440 days.

(21) Appl. No.: 15/015,542

(22) Filed: Feb. 4, 2016

(65) Prior Publication Data

US 2016/0268607 A1 Sep. 15, 2016

(30) Foreign Application Priority Data

Mar. 12, 2015 (JP) ................................ 2015-049523

(51) Int. Cl.
*H01M 4/13* (2010.01)
*H01M 4/60* (2006.01)
*H01M 10/052* (2010.01)

(52) U.S. Cl.
CPC .......... *H01M 4/60* (2013.01); *H01M 10/052* (2013.01)

(58) Field of Classification Search
CPC .............................. H01M 4/60; H01M 10/052
See application file for complete search history.

(56) References Cited

U.S. PATENT DOCUMENTS

2004/0115529 A1 6/2004 Nakahara et al.
2015/0243973 A1* 8/2015 Newbound .............. B05D 1/12
429/126

FOREIGN PATENT DOCUMENTS

| JP | 55-161375 | 12/1980 |
|---|---|---|
| JP | 04-087258 | 3/1992 |
| JP | 07-085420 | 9/1995 |
| JP | 2715778 | 11/1997 |
| JP | 2000-82467 | 3/2000 |
| JP | 2004-200106 | 7/2004 |
| JP | 2010-080343 | 4/2010 |
| JP | 4687848 | 2/2011 |
| JP | 2013-020760 | 1/2013 |

OTHER PUBLICATIONS

Office Action dated Feb. 19, 2019 in Japanese Patent Application No. 2015-049523, filed Mar. 12, 2015.

* cited by examiner

*Primary Examiner* — Jane J Rhee (74) *Attorney, Agent, or Firm* — Oblon, McClelland, Maier & Neustadt, L.L.P.

(57) ABSTRACT

Provided is a secondary battery that includes an electrode active material including an organic compound represented by the following General Formula 1.

$$Ar-(OH)_n \qquad \text{<General Formula 1>}$$

In the General Formula 1, Ar denotes at least one selected from the group consisting of 1,1-binaphthalene, anthracene, triphenylene, tetraphenylene, and pyrene, and is optionally substituted with a substituent. The substituent of Ar is at least one selected from the group consisting of an OH group, a carbonyl group produced through oxidization of the OH group, an alkyl group containing 3 or less carbon atoms, a halogen atom, and an amino group. n denotes an integer in a range of from 2 through 8.

11 Claims, 2 Drawing Sheets

SECONDARY BATTERY

CROSS-REFERENCE TO RELATED APPLICATIONS

The present application claims priority under 35 U.S.C. § 119 to Japanese Patent Application No. 2015-049523, filed Mar. 12, 2015. The contents of which are incorporated herein by reference in their entirety.

BACKGROUND OF THE INVENTION

Field of the Invention

The present invention relates to secondary batteries such as a lithium ion secondary battery.

Description of the Related Art

A secondary battery takes out electrical energy by converting chemical energy to the electrical energy through a redox reaction at a cathode and an anode, or accumulate the electrical energy through a reverse reaction thereof. The secondary battery has been used as a power source in various devices.

Recently, due to rapid market growth of a device such as a laptop computer or a smartphone, demand has been increasing for dramatically improving energy density and output density of the secondary battery used for the device. In order to alleviate the power shortage after Great East Japan Earthquake, expectations have been rising for development of a large scale and large capacity secondary battery. For the purpose of meeting the above demands, there has been actively developed a lithium ion secondary battery that includes an alkaline metal ion (e.g., a lithium ion) as a charge carrier and utilizes an electrochemical reaction resulting from donating and accepting electrons by the charge carrier.

Most of the lithium ion secondary batteries include an electrode material on a cathode side (cathode active material) having smaller discharge capacity (Ah/Kg) than an electrode material on an anode side (anode active material). This is a main reason why the lithium ion secondary batteries cannot be increased in capacity. Lithium ion secondary batteries currently available in the market include a metal oxide having a large specific gravity as the cathode active material, which is problematic in terms of insufficient battery capacity per unit mass. Therefore, many attempts have been made and reported to develop a large capacity secondary battery using a lighter electrode material, that is, an organic compound (e.g., see U.S. Pat. No. 4,833,048, Japanese Patent No. 2715778, Japanese Examined Patent Publication No. 7-85420, Japanese Patent No. 4687848, Japanese Unexamined Patent Application Publication No. 2010-80343, "Chemical Physics Letters, 359, (2002) 351-354" and "Nature Materials, 10, (2011) 947-951). However, the art described in the above related art references has resulted in unsatisfactory secondary batteries.

Recently, there has been suggested a charge and discharge mechanism utilizing a redox reaction of quinone by introducing, as a side chain, a functional moiety containing a quinone skeleton (quinone moiety) into a polymer main chain (e.g., see Japanese Unexamined Patent Application Publication No. 2013-20760). In this art, due to anionic stability of the quinone moiety, charge and discharge proceed through a rocking chair mechanism in which only Li ions are transported. Therefore, the charge and discharge can be stably performed without varying a concentration of an electrolytic solution during the charge and discharge. However, in the art described in Japanese Unexamined Patent Application Publication No. 2013-20760, the discharge capacity per unit mass is decreased because the quinone moiety is introduced into the polymer. Therefore, there is a problem that the quinone cannot exhibit the discharge capacity sufficiently.

SUMMARY OF THE INVENTION

An object of the present invention is to provide a secondary battery having high energy density and good cycling property.

A secondary battery of the present invention as a means for solving the above problems includes an electrode active material including an organic compound represented by the following General Formula 1.

Ar—(OH)$_n$ <General Formula 1>

In the General Formula 1, Ar denotes at least one selected from the group consisting of 1,1-binaphthalene, anthracene, triphenylene, tetraphenylene, and pyrene, and is optionally substituted with a substituent. The substituent of Ar is at least one selected from the group consisting of an OH group, a carbonyl group produced through oxidization of the OH group, an alkyl group containing 3 or less carbon atoms, a halogen atom, and an amino group. n denotes an integer in a range of from 2 through 8.

The present invention can provide a secondary battery having high energy density and good cycling property.

DETAILED DESCRIPTION OF THE INVENTION (Secondary Battery)

A secondary battery of the present invention includes, as an electrode active material, an organic compound represented by the following General Formula 1.

Ar—(OH)$_n$ <General Formula 1>

In the General Formula 1, Ar denotes at least one selected from the group consisting of 1,1-binaphthalene, anthracene, triphenylene, tetraphenylene, and pyrene, and is optionally substituted with a substituent. The substituent of Ar is at least one selected from the group consisting of an OH group, a carbonyl group produced through oxidization of the OH group, an alkyl group containing 3 or less carbon atoms, a halogen atom, and an amino group. n denotes an integer in a range of from 2 through 8.

Examples of the halogen atom include a fluorine atom, a chlorine atom, and a bromine atom.

The substituent of Ar in the General Formula 1 is preferably at least one selected from the group consisting of an OH group, a carbonyl group produced through oxidization of the OH group, and a halogen atom.

The Ar in the General Formula 1 is preferably at least one selected from the group consisting of substituted or unsubstituted 1,1-binaphthalene, substituted or unsubstituted anthracene, and substituted or unsubstituted triphenylene.

The n in the General Formula 1 is a natural number in a range of from 2 through 8, preferably a natural number in a range of from 2 through 6.

The electrode active material includes an electrode active material for a cathode (cathode active material) and an electrode active material for an anode (anode active material). The organic compound represented by the General Formula 1 is preferably included in at least one of the cathode active material and the anode active material. Of these, the organic compound is particularly preferably included in the cathode active material.

The organic compound represented by the General Formula 1 is a small molecular aromatic compound containing a hydroxyl group (OH group) and a stabilized redox compound. Therefore, the organic compound represented by the General Formula 1 can be effectively used for a secondary battery which utilizes, as the electrode active material, an organic compound undergoing a redox reaction in the course of at least one of a charge reaction and a discharge reaction.

Use of the organic compound represented by the General Formula 1 as the electrode active material can provide a secondary battery having high energy density and good cycling property. The secondary battery utilizes, as the electrode active material, a stabilized organic compound represented by the General Formula 1, resulting in a stabilized charge and discharge cycle and a prolonged service life.

Specific exemplary compounds of the organic compound represented by the General Formula 1 are presented below, but are not limited thereto.

1

2

3

4

5

6

7

8

9

10

Among exemplary compounds of the organic compound represented by the General Formula 1, particularly preferable are the compound Nos. 4, 24, and 34 in terms of ease of purification and large theoretical capacity.

The organic compound represented by the General Formula 1 may be appropriately synthesized or may be a commercially available product.

Examples of a method for synthesizing the organic compound include a method in which a halogenated aryl compound represented by the formula Ar—(X)$_1$ is hydrolyzed with alkaline and a method in which the halogenated aryl is methoxylated and then demethylated, as illustrated by the following Reaction scheme 5. Notably, in the Reaction scheme 5, X denotes a halogen atom such as Cl, Br, and I; and n denotes a natural number in a range of from 2 through 8.

<Reaction scheme 5>

Examples of the commercially available product include the compound Nos. 4, 23, 24, 25, 26, 27, 28, 30, 32, and 34.

A charge and discharge mechanism of the secondary battery utilizing the redox reaction of the organic compound represented by the General Formula 1 will now be described taking 2,3,6,7,10,11-hexahydroxytriphenylene as an example.

As illustrated in the following Reaction scheme 6-1, a small molecular aromatic compound containing hydroxyl groups is converted to quinone through an oxidization reaction within the secondary battery. Then, as illustrated in the following Reaction scheme 6-2, the quinone is reacted with lithium ions to function as the cathode active material for the secondary battery. That is, six electrons passed through an external circuit and six lithium ions are reacted with the quinone to release electrons as the secondary battery (discharge), and the above reaction is reversed to accumulate electrons as the secondary battery (charge). Thus, the charge and discharge mechanism is repeated to effect the charge and discharge of the secondary battery.

<Reaction scheme 6-1>

<Reaction scheme 6-2>

The secondary battery of the present invention is not particularly limited and may be appropriately selected depending on the intended purpose, so long as the secondary battery contains, as the electrode active material, the organic compound represented by the General Formula 1. However, the secondary battery includes a cathode, an anode, and an electrolyte, preferably includes a separator, and, if necessary, further includes other members.
<Cathode, Anode>
The cathode consists of a cathode collector and a cathode layer that contains a cathode active material. The anode consists of an anode collector and an anode layer that contains an anode active material.
<<Cathode Layer, Anode Layer>>
An electrode layer consists of an electrode layer for a cathode and an electrode layer for an anode. Each of the electrode layers contains the electrode active material, preferably contains the electrode active material, a binder, and a conductive aid, and, if necessary, further includes other components such as additives (e.g., metal oxides and redox compounds).
—Electrode Active Material—
The electrode active material is at least one of the cathode active material and the anode active material.
The electrode active material includes the organic compound represented by the General Formula 1.
The organic compound represented by the General Formula 1 can be used as the cathode electrode active material or the anode electrode active material. However, the organic compound is preferably used as the cathode active material in terms of the energy density of materials commonly used for the anode.
In the case where the organic compound represented by the General Formula 1 is used as the cathode active material, the anode active material may be, for example, graphite, amorphous carbon, lithium metal, lithium alloy, lithium-ion storing carbon, or conductive polymers. These may be used alone or in combination.
A shape of the anode active material is not particularly limited and may be appropriately selected depending on the intended purpose. For example, the lithium metal may be in the form of bulk, compressed powder, fiber, or flake, as well as thin film.
Meanwhile, in the case where the organic compound represented by the General Formula 1 is used as the anode active material, the cathode active material may be, for example, metal oxides, disulfide compounds, nitroxy radical compounds, and conductive polymers. A composite active material produced by mixing these materials with conventionally known active materials may be used.

Examples of the metal oxides include lithium manganates such as $LiMnO_2$, $LiNi_{0.5}Mn_{1.5}O_4$, $Li_xMn_2O_4$ (0<x<2), and those having Spinel structure; layered compounds such as $LiCoO_2$, $LiNiO_2$, and $LiNi_{1/3}Co_{1/3}Mn_{1/3}O_2$; and phosphate compounds such as $LiFePO_4$, $LiCoPO_4$, and $LiNiPO_4$. These may be used alone or in combination.
Examples of the disulfide compounds include dithioglycol, 2,5-dimercapto-1,3,4-thiadiazole, and S-triazine-2,4,6-trithiol. These may be used alone or in combination.
Examples of the conductive polymers include polyacetylene, polyphenylene, polythiophene, polyaniline, and polypyrrole. These may be used alone or in combination.
In the case where the organic compound represented by the General Formula 1 is used to produce the cathode and the anode, the electrode layer may contain substances other than the small molecular aromatic compound containing a hydroxyl group, for example, metal oxides or redox compounds.
Examples of the metal oxides include lithium manganates such as $LiMnO_2$, $LiNi_{0.5}Mn_{1.5}O_4$, $Li_xMn_2O_4$ (0<x<2), and those having Spinel structure; layered compounds such as $LiCoO_2$, $LiNiO_2$, and $LiNi_{1/3}Co_{1/3}Mn_{1/3}O_2$; and phosphate compounds such as $LiFePO_4$, $LiCoPO_4$, and $LiNiPO_4$.
Examples of the redox compounds include organic compounds such as oxy redox compounds, nitroxyl redox compounds, nitrogen redox compounds, carbon redox compounds, and boron redox compounds.
Specific examples of the redox compounds include compounds represented by the following Formulae (R-1) to (R-12). Notably, n in the Formulae denotes a natural number that denotes the number of repeated units.

(R-1)

(R-2)

(R-3)

(R-4)

(R-5)

(R-6)

(R-7)

(R-8)

(R-9)

(R-10)

(R-11)

-continued (R-12)

—Binder—

The binder is contained for enhancing binding between components.

The binder is not particularly limited and may be appropriately selected depending on the intended purpose. Examples of the binder include polyvinylidene fluoride, vinylidene fluoride-hexafluoropropylene copolymers, vinylidene fluoride-tetrafluoroethylene copolymers, styrene-butadiene copolymer rubber, polypropylene, carboxymethyl cellulose, polyethylene, polyimide, and various polyurethane. These may be used alone or in combination.

An amount of the binder is not particularly limited and may be appropriately selected depending on the intended purpose, but is preferably in a range of from 5% by mass through 20% by mass.

—Conductive Aid—

The conductive aid is contained for aiding in transporting electrons between the collector the electrode active material.

The conductive aid is not particularly limited and may be appropriately selected depending on the intended purpose. Examples of the conductive aid include fullerenes such as $C_{60}$ fullerene and $C_{70}$ fullerene; nanocarbons such as single layer carbon nanotubes, multilayer carbon nanotubes, and graphene; carbon blacks such as Ketjen black and acetylene black; activated carbons having high specific surface area, mesoporous carbons, and vapor grown carbon fibers. These may be used alone or in combination.

An amount of the conductive aid is not particularly limited and may be appropriately selected depending on the intended purpose, but is preferably in a range of from 100 parts by mass through 800 parts by mass relative to 100 parts by mass of the binder.

<Cathode Collector, Anode Collector>

The collector is formed of a conductor and is a member configured to collect charges generated from an electrode of a battery. The collector includes the cathode collector and the anode collector.

A shape, size, and structure of the collector are not particularly limited and may be appropriately selected depending on the intended purpose.

A material of the collector is not particularly limited and may be appropriately selected depending on the intended purpose. Examples thereof include metallic foils, metallic plates, or mesh-like electrodes that are made of, for example, nickel, aluminium, copper, gold, silver, aluminium alloys, and stainless; and carbon electrode. Notably, the electrode active material may be chemically bonded with the collector.

<Electrolyte>

The electrolyte is configured to transport charge carriers between the anode and the cathode, and generally has ion conductivity in a range of from $10^{-5}$ S/cm through $10^{-1}$ S/cm at room temperature (25° C.).

The electrolyte may be an electrolytic solution in which an electrolyte salt is dissolved into a solvent.

—Electrolyte Salt—

The electrolyte salt is not particularly limited and may be appropriately selected depending on the intended purpose. Examples of the electrolyte salt include $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$. These may be used alone or in combination.

An amount of the electrolyte salt is not particularly limited and may be appropriately selected depending on the intended purpose, but is preferably in a range of from 0.5 mol/L through 3.0 mol/L, more preferably in a range of from 0.5 mol/L through 2.0 mol/L.

—Solvent—

The solvent is not particularly limited and may be appropriately selected depending on the intended purpose. Examples of the solvent include organic solvents such as ethylene carbonate, propylene carbonate, dimethyl carbonate, diethyl carbonate, methyl ethyl carbonate, γ-butyrolactone, triethylene glycol dimethyl ether, tetraethylene glycol dimethyl ether, tetrahydrofuran, dioxolane, sulfolane, dimethylformamide, dimethylacetamide, and N-methyl-2-pyrrolidone; ammonium-, imidazolium-, pyridinium-, piperidinium-, or pyrrolidinium-ionic liquids such as trimethyl propyl ammonium bis(trifluoromethanesulfonyl)imide, 1-ethyl-3-methyl imidazolium tetrafluoroborate, 1-ethyl-3-methyl imidazolium bis(trifluoromethanesulfonyl)imide, 1-butyl pyridinium tetrafluoroborate, 1-methyl-1-propyl piperidinium bis(trifluoromethanesulfonyl)imide, and 1-methyl-1-propyl pyrrolidinium bis(trifluoromethanesulfonyl)imide. These may be used alone or in combination.

—Solid Electrolyte—

The electrolyte may be a solid electrolyte.

A polymer used for the solid electrolyte is not particularly limited and may be appropriately selected depending on the intended purpose. Examples of the polymer include vinylidene fluoride copolymers such as polyvinylidene fluoride, vinylidene fluoride-hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers, and vinylidene fluoride-hexafluoropropylene-tetrafluoroethylene terpolymers; acrylonitrile polymers such as acrylonitrile-methyl methacrylate copolymers, acrylonitrile-methyl acrylate copolymers, acrylonitrile-ethyl methacrylate copolymers, acrylonitrile-ethyl acrylate copolymers, acrylonitrile-methacrylic acid copolymers, acrylonitrile-acrylic acid copolymers, and acrylonitrile-vinyl acetate copolymers; polyethylene oxides, ethylene oxide-propylene oxide copolymers, or polymers of acrylate or methacrylate thereof.

Notably, when the polymers are used as the solid electrolyte, the polymers may be impregnated with the electrolytic solution to be gelled or may be used as such. These may be used alone or in combination.

<Separator>

A separator is disposed between the cathode and the anode and configured to prevent a short-circuit between the cathode and the anode.

A material of the separator is not particularly limited and may be appropriately selected depending on the intended purpose. Examples of the material include paper, cellophane, polyolefin nonwoven fabric, polyamide nonwoven fabric, and glass fiber nonwoven fabric. Examples of the paper include kraft paper, vinylon blended paper, and synthetic pulp blended paper.

A shape of the separator is not particularly limited and may be appropriately selected depending on the intended purpose. For example, the separator may be in the form of sheet.

The separator may have a single layer structure or a multilayer structure.

A size of the separator is not particularly limited and may be appropriately selected depending on the intended purpose.

The separator is preferably impregnated with the electrolyte. Notably, when the solid electrolyte such as an ion conductive polymer is used as the electrolyte, the separator itself may be omitted.

<Outer Container>

A material of the outer container is not particularly limited and may be appropriately selected depending on the intended purpose. Examples of the material include metals such as copper, stainless steel, and nickel-plated stainless steel or iron.

A shape of the outer container is not particularly limited and may be appropriately selected depending on the intended purpose. For example, the outer container may be in the form of a shallow dish of which periphery is warped up, a bottomed cylinder, or a bottomed prism.

The outer container may have a single layer structure or a layered structure. Example of the layered structure includes a trilayer structure of nickel, stainless steel, and copper.

A size of the outer container is not particularly limited and may be appropriately selected depending on the intended purpose.

A method for producing the secondary battery of the present invention is not particularly limited and may be appropriately selected depending on the intended purpose. For example, the secondary battery may be produced by laminating the cathode, the anode, a nonaqueous electrolytic solution, and optionally the separator into an appropriate shape. Moreover, other members such as an outer can be used, if necessary. A method for laminating the cathode and the anode is not particularly limited and may be appropriately selected from commonly employed methods. Examples of the method include a method in which the cathode and the anode are multilayer-laminated, a method in which the cathode and the anode are laminated on each surface of the collector to form a laminate and then the laminate is combined with each other, and a method in which the cathode and the anode are wound around each other.

A shape of the secondary battery is not particularly limited and may be appropriately selected depending on the intended purpose. For example, the secondary battery may be in the form of coin, cylinder, rectangle, sheet, or button.

Figure 1:
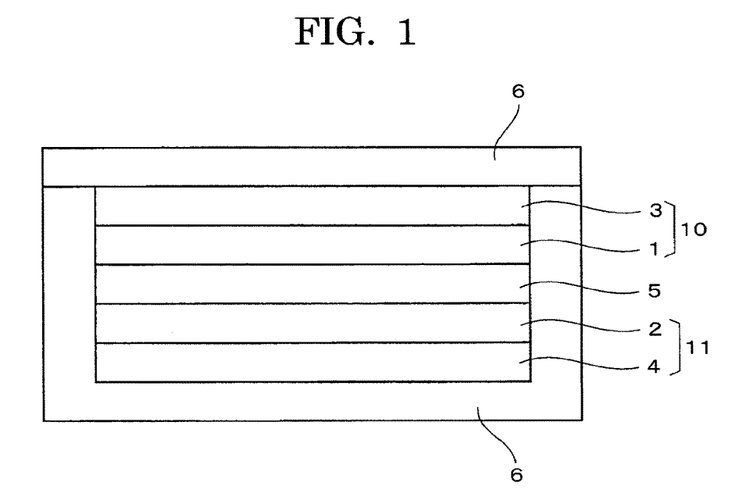
FIG. 1 is a schematic cross-sectional view illustrating one exemplary secondary battery according to the present invention.

FIG. 1 is a schematic cross-sectional view illustrating one exemplary secondary battery according to the present invention. This secondary battery includes, as an anode 10, an anode collector 3 and an anode layer 1 that contains an anode active material; and includes, as a cathode 11, a cathode collector 4 and a cathode layer 2 that contains a cathode active material. A separator 5 that contains an electrolyte is disposed between the cathode 11 and the anode 10.

The secondary battery of the present invention includes the anode collector 3, the anode layer 1, the separator 5 that contains an electrolyte, the cathode layer 2, and the cathode collector 4 which are laminated in an outer container 6 in this order, as illustrated in FIG. 1.

<Application>

The secondary battery of the present invention is suitably a lithium ion secondary battery.

Application of the secondary battery is not particularly limited and may be used in various applications such as a laptop computer, a stylus-operated computer, a mobile computer, a smartphone, an electronic book player, a mobile phone, a mobile fax, a mobile copier, a mobile printer, a headphone stereo, a video movie, a liquid crystal television, a handy cleaner, a portable CD, a minidisk, a transceiver, an electronic organizer, a calculator, a memory card, a mobile tape recorder, a radio, a motor, a lighting equipment, a toy, a game equipment, a clock, a strobe, a power supply of a camera, and a back-up power supply.

EXAMPLES

Examples of the present invention will now be described, but the present invention is not limited thereto.

Example 1

<Production of Secondary Battery>
—Production of Cathode—

The compound 4, acetylene black (DENKA BLACK, manufactured by Denka Company Limited) serving as a conductive aid, and poly(vinylidene fluoride) (KF POLYMER L#1120, manufactured by KUREHA CORPORATION) serving as a binder were mixed together. To this, 17 mL of N-methylpyrrolidone (dehydrating solvent, manufactured by KANTO CHEMICAL CO., INC.) was added, followed by kneading until homogeneous to thereby obtain black paste. Notably, the compound 4, the conductive aid, and the binder were mixed in a mass ratio of 2:6:2.

Next, the resultant paste was uniformly applied onto a sheet of aluminium foil (manufactured by UACJ Foil Corporation, thickness: 20 μm) using a tool for blade coating. The resultant coating film was placed into a hot air drier previously set at 100° C. and dried for 20 min to thereby produce a cathode layer. The resultant cathode layer was the cut into a circle having a diameter of 16 mm, which was used as a circular cathode.

Next, the circular cathode, the porous polypropylene film separator having a diameter of 16 mm, an anode formed of a circular Li metallic foil having a diameter of 16 mm were laminated in this order in an outer container made of stainless steel within a glove box (dew point: −75° C. or lower).

Then, the outer container was filled with, as an electrolyte, 400 μL of a mixed solution of ethylene carbonate/diethyl carbonate (volume ratio: 1:2) containing 1.0 mol/L of $LiPF_6$.

Finally, the outer container was sealed with a stainless steel cap. Thus, a secondary battery of Example 1 was produced.

Examples 2 to 16

<Production of Secondary Battery>

Secondary batteries of Examples 2 to 16 were produced in the same manner as in Example 1, except that the compound 4 was changed to organic compounds represented by compound numbers described in rows of Examples 2 to 16 in Table 1.

Comparative Example 1

<Production of Secondary Battery>

A secondary battery of Comparative Example 1 was produced in the same manner as in Example 1, except that the compound 4 was changed to the following comparative compound 1.

Comparative compound 1

In the above formula, n denotes a natural number which denotes the number of repeated units.

Comparative Example 2

<Production of Secondary Battery>

A secondary battery of Comparative Example 2 was produced in the same manner as in Example 1, except that the compound 4 was changed to the following comparative compound 2.

Comparative compound 2

Thus produced secondary batteries of Examples 1 to 16 and Comparative Examples 1 and 2 were evaluated for discharge capacities as follows. Results are present in Table 1.

<Measurement of Discharge Capacity>

Figure 2:
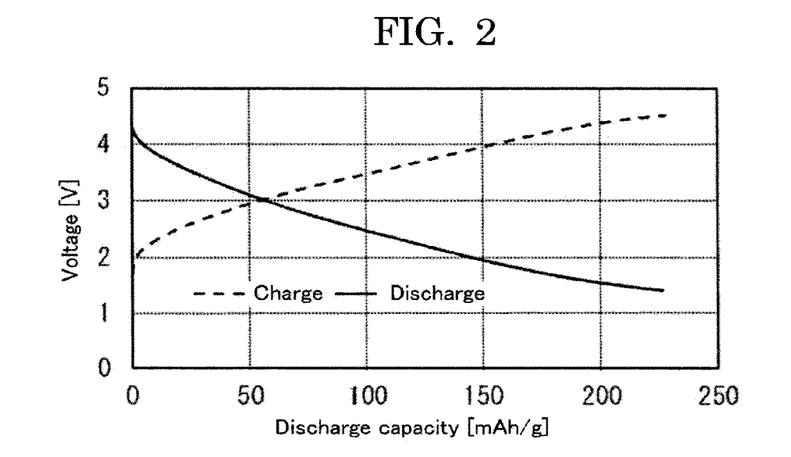
FIG. 2 is a plot of voltage-discharge capacity at 200th cycle of charge and discharge in Example 1.

Each of the secondary batteries of Examples and Comparative Examples was charged and discharged with constant current (1C rate; 1C rate means a current value at which a full capacity of the secondary battery is charged or discharged for 1 hour) at a charge cut-off voltage of 4.5 V and a discharge cut-off voltage of 1.4 V. Thus, a discharge capacity per a cathode active material was verified as presented in Table 1. Notably, the discharge capacity per the cathode active material was measured with an automatic battery evaluation device (1024B-7V 0.1A-4, manufactured by Electro Field Co., ltd.). Notably, FIG. 2 is a plot of voltage-discharge capacity at 200th cycle of 1C charge and discharge in the secondary battery of Example 1.

TABLE 1

| | Compound No. | Discharge capacity after 200 cycles of 1 C charge and discharge |
|---|---|---|
| Example 1 | 4 | 228 mAh/g |
| Example 2 | 6 | 205 mAh/g |
| Example 3 | 10 | 211 mAh/g |
| Example 4 | 14 | 207 mAh/g |
| Example 5 | 23 | 170 mAh/g |
| Example 6 | 24 | 220 mAh/g |
| Example 7 | 26 | 160 mAh/g |
| Example 8 | 27 | 170 mAh/g |
| Example 9 | 30 | 130 mAh/g |
| Example 10 | 31 | 225 mAh/g |
| Example 11 | 32 | 190 mAh/g |
| Example 12 | 33 | 195 mAh/g |
| Example 13 | 34 | 150 mAh/g |
| Example 14 | 36 | 190 mAh/g |
| Example 15 | 38 | 200 mAh/g |
| Example 16 | 42 | 193 mAh/g |
| Comparative Example 1 | Comparative compound 1 | 82 mAh/g |
| Comparative Example 2 | Comparative compound 2 | 19 mAh/g |

As can be seen from the results in Table 1, the secondary batteries of Examples 1 to 16 in which the organic compounds represented by the General Formula 1 were used as the cathode active material exhibited large discharge capacities even after 200 cycles of charge and discharge, indicating that the secondary batteries operate well.

In contrast, the secondary battery of Comparative example 1 was found to have small discharge capacity because the secondary battery was less deteriorated in capacity, but had only small theoretical capacity.

The secondary battery of Comparative example 2 was found to have small discharge capacity because the secondary battery had large theoretical capacity, but the cathode active material of the secondary battery contained a smaller benzene ring as a core than the organic compounds represented by the General Formula 1 used in Examples, leading to leakage of the cathode active material into the electrolytic solution.

Example 17

<Production of Secondary Battery>

The electrode used as the cathode in Example 1 was used as the anode to verify an effect as the anode active material. Notably, a secondary battery of Example 17 was produced in the same manner as in Example 1, except that LiCoO$_2$ (manufactured by Strem Chemicals Inc.) was used as the cathode instead of the organic compound represented by the compound No. 4.

Comparative Example 3

<Production of Secondary Battery>

A secondary battery of Comparative Example 3 was produced in the same manner as in Example 17, except that the comparative compound 2 was used as the anode active material instead of the organic compound represented by the compound No. 4.

<Measurement of Discharge Capacity>

Each of the secondary batteries of Example 17 and Comparative Example 3 was charged and discharged with constant current (1C rate; 1C rate means a current value at which a full capacity of the secondary battery is charged or discharged for 1 hour) at a charge cut-off voltage of 4.3 V and a discharge cut-off voltage of 3.0 V. Thus, a discharge capacity per the anode active material was verified as presented in Table 2. Notably, the discharge capacity per the anode active material was measured with the automatic battery evaluation device (1024B-7V 0.1A-4, manufactured by Electro Field Co., ltd.). Notably, FIG. 3 is a plot of voltage-discharge capacity after 200 cycles of 1C charge and discharge in the secondary battery of Example 17 and Comparative Example 3.

TABLE 2

| | Compound No. | Discharge capacity after 200 cycles of 1 C charge and discharge |
|---|---|---|
| Example 17 | 4 | 183 mAh/g |
| Comparative Example 3 | Comparative compound 2 | 12 mAh/g |

Figure 3:
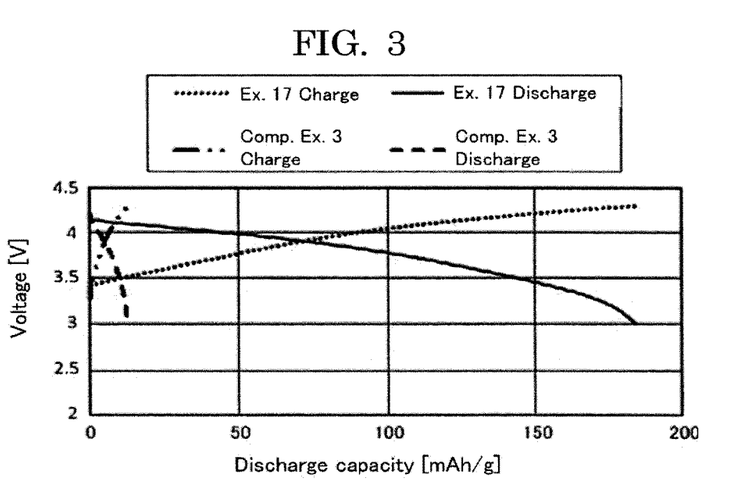
FIG. 3 is a plot of voltage-discharge capacity after 200 cycles of charge and discharge in Example 17 and Comparative Example 3.

As can be seen from the results in Table 2 and FIG. 3, the secondary battery of Example 17 in which the organic compound represented by the compound No. 4 was used as the anode active material exhibited large discharge capacities even after 200 cycles of charge and discharge, indicating that the secondary batteries operate well.

Aspects of the present invention are as follows:

<1> A secondary battery including
an electrode active material, the electrode active material including:
an organic compound represented by General Formula 1 below:

Ar—(OH)$_n$  <General Formula 1> where Ar denotes at least one selected from the group consisting of 1,1-binaphthalene, anthracene, triphenylene, tetraphenylene, and pyrene, Ar is optionally substituted with a substituent, the substituent of Ar is at least one selected from the group consisting of an OH group, a carbonyl group produced through oxidization of the OH group, an alkyl group containing 3 or less carbon atoms, a halogen atom, and an amino group, and n denotes an integer in a range of from 2 through 8.

<2> The secondary battery according to <1>,
wherein the secondary battery includes a cathode, an anode, and an electrolyte, and
wherein at least one of the electrode active material for the cathode and the electrode active material for the anode includes the organic compound represented by the General Formula 1.

<3> The secondary battery according to <2>,
wherein the electrode active material for the cathode includes the organic compound represented by the General Formula 1.

<4> The secondary battery according to any one of <1> to <3>,
wherein the substituent of Ar in the General Formula 1 is at least one selected from the group consisting of an OH group, a carbonyl group produced through oxidization of the OH group, and a halogen atom.

<5> The secondary battery according to any one of <1> to <4>,
wherein the halogen atom is at least one selected from the group consisting of a fluorine atom, a chlorine atom, and a bromine atom.

<6> The secondary battery according to any one of <1> to <5>,
wherein Ar in the General Formula 1 is at least one selected from the group consisting of substituted or unsubstituted 1,1-binaphthalene, substituted or unsubstituted anthracene, and substituted or unsubstituted triphenylene.

<7> The secondary battery according to any one of <1> to <6>,
wherein the secondary battery is a lithium ion secondary battery.

What is claimed is:

1. A secondary battery, comprising an electrode active material comprising:
an organic compound, which is at least one of a substituted anthracene and a compound represented by formula (1) below:

Ar—(OH)$_n$  (1), wherein:
Ar denotes at least one selected from the group consisting of 1,1-binaphthalene, triphenylene, tetraphenylene, and pyrene, Ar is optionally substituted with a substituent, the substituent of Ar is at least one selected from the group consisting of an OH group, a carbonyl group produced through oxidization of the OH group, an alkyl group containing 3 or less carbon atoms, a halogen atom, and an amino group;
n denotes an integer ranging from 2 to 8; and
the substituted anthracene is compound No. 23, 24, 25, 26, 27, 28, 29, 30, 31, 32 or 33:

23

24

25

26

27

2. The secondary battery according to claim 1, wherein: the secondary battery further comprises a cathode, an anode, and an electrolyte; and at least one of an electrode active material for the cathode and an electrode active material for the anode comprises the organic compound.

3. The secondary battery according to claim 2, wherein the electrode active material for the cathode comprises the organic compound.

4. The secondary battery according to claim 1, wherein Ar is substituted with at least one selected from the group consisting of an OH group, a carbonyl group produced through oxidization of the OH group, and a halogen atom.

5. The secondary battery according to claim 1, wherein Ar is substituted with at least one selected from the group consisting of a fluorine atom, a chlorine atom, and a bromine atom.

6. The secondary battery according to claim 1, wherein Ar is at least one selected from the group consisting of substituted or unsubstituted 1,1-binaphthalene, substituted or unsubstituted anthracene, and substituted or unsubstituted triphenylene.

7. The secondary battery according to claim 1, wherein n is an integer ranging from 2 to 6.

8. The secondary battery according to claim 1, wherein the organic compound is compound No. 4, 24, or 34 below:

9. The secondary battery according to claim 1, wherein the secondary battery is a lithium ion secondary battery.

10. A secondary battery, comprising a cathode, an anode and an electrolyte,
wherein:
the cathode has a cathode layer comprising a cathode active material, and the anode has an anode layer comprising an anode active material;
at least one of the cathode layer and the anode layer is a coating layer of a kneaded material obtained by mixing an electrode active material, a conductive aid and a binder;
the electrode active material that is mixed in the coating layer comprises an organic compound represented by formula (1) below as a main component:

$$Ar-(OH)_n \qquad (1),$$

wherein:
Ar denotes at least one selected from the group consisting of a substituted or unsubstituted 1,1-binaphthalene, a substituted or unsubstituted anthracene, and a substituted or unsubstituted triphenylene;
n denotes an integer ranging from 2 to 8.

11. The secondary battery according to claim 10, wherein Ar is at least one selected from the group consisting of a substituted or unsubstituted 1,1-binaphthalene, an unsubstituted anthracene, and a substituted or unsubstituted triphenylene.

* * * * *